H. W. WEED.
FOLDING BACK.
APPLICATION FILED JAN. 4, 1917.
1,227,351.
Patented May 22, 1917.
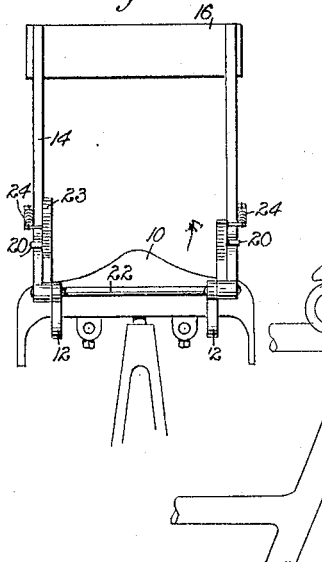
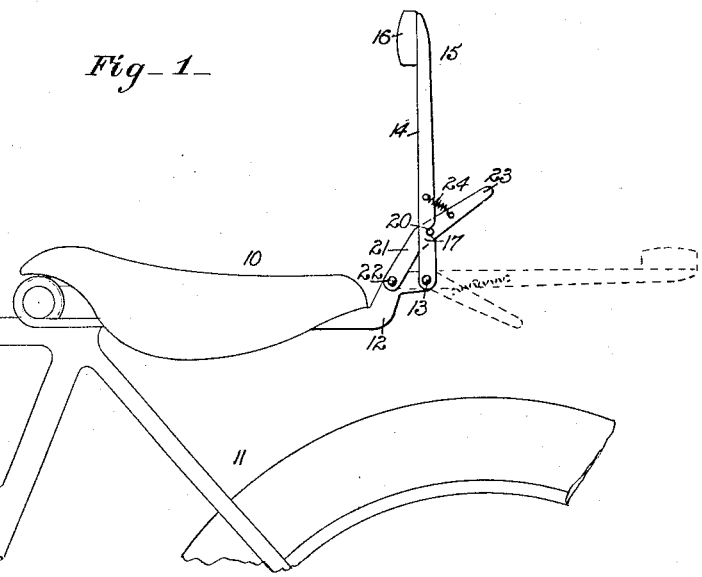
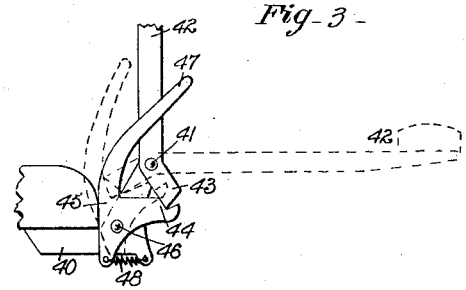
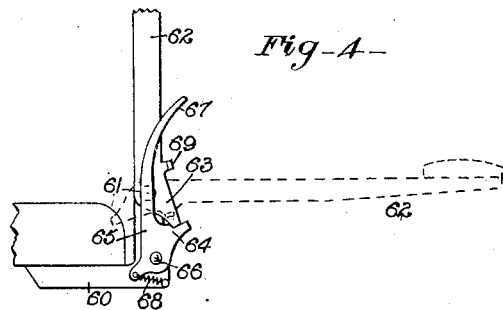
WITNESSES
Frank C. Palmer.
INVENTOR
Howard W. Weed
BY
ATTORNEYS

UNITED STATES PATENT OFFICE.

HOWARD W. WEED, OF STAMFORD, CONNECTICUT.

FOLDING BACK.

1,227,351.     Specification of Letters Patent.     Patented May 22, 1917.

Application filed January 4, 1917. Serial No. 140,592.

*To all whom it may concern:*

Be it known that I, HOWARD W. WEED, a citizen of the United States, and a resident of Stamford, in the county of Fairfield and State of Connecticut, have invented a new and Improved Folding Back, of which the following is a full, clear, and exact description.

The invention relates to folding back attachments such as shown and described in the Letters Patent of the United States, No. 1,146,676, granted to me on July 13, 1915.

The object of the present invention is to provide a new and improved folding back for motor cycles, bicycles and like machines and devices, arranged to permit the rider to readily swing the folding back into an approximately horizontal position for mounting and dismounting purposes, and to swing the folding back into upright position for supporting the back of the rider. Another object is to simplify the construction of the folding back.

In order to accomplish the desired result, use is made of a back mounted to swing on a support attached to or forming part of the saddle, and a combined catch and releasing lever having a handle and adapted to lock the said back in upright position, the lever being also adapted to release the back to allow the latter to swing into an approximately horizontal position.

A practical embodiment of the invention is represented in the accompanying drawings forming a part of this specification, in which similar characters of reference indicate corresponding parts in all the views.

Figure 1 is a side elevation of the folding back as applied to a motor cycle, and disposed in upright position for supporting the back of the rider.

Fig. 2 is a rear elevation of the same; and

Figs. 3 and 4 are side elevations of modified forms of the folding back.

The saddle 10 of a motor cycle, bicycle or similar machine 11 is of any approved construction, and is provided at its rear end with a support 12 provided with a pivot 13 for the side arms 14 of the back 15 to swing on from normal upright position to an approximately horizontal position or vice versa, as will be readily understood by reference to Fig. 1. The back 15 is provided at its upper end with the usual back rest 16 connecting the side arms 14 with each other. The rear edges of the side arms 14 of the back 15 are provided with notches 17 engaged by pins 20 held on a combined catch and releasing lever 21 fulcrumed at 22 on the support 12 in front of the pivot 13. The combined catch and releasing lever 21 is provided with a handle 23 connected by a spring 24 with one of the side arms 14 of the back 15 so as to normally hold the pins 20 in engagement with the notches 17. It will be noticed that when the back 15 is in upright position it is held against rearward movement thereof by the pins 20 engaging the notches 17, but when it is desired to swing the back 15 into an approximately horizontal position it is only necessary for the rider to take hold of the handle 23 and press the same rearwardly and downwardly to impart a downward swinging movement to the combined catch and releasing lever 21 so that the pins 20 move out of engagement with the notches 17 thus unlocking the back 15 and at the same time the spring 24 exerts a pull on the back 15 to swing the same downwardly and rearwardly into an approximately horizontal position, as indicated in Fig. 1. When it is desired to return the back 15 to vertical supporting position then the operator swings the combined catch and releasing lever 21 upwardly and forwardly whereby the pins 20 impart a like swinging movement to the back 15 and the pins 20 finally engage the notches 17 at the time the back 15 reaches an upright position. It will be noticed that as the combined catch and releasing lever 21 extends upwardly and rearwardly it firmly presses the back 15 so as to hold the same against rearward and downward swinging movement at the time the back is pressed on by the rider leaning against the back rest 16.

In the modified form shown in Fig. 3, the bracket 40 is provided with a pivot 41 for the back 42 to swing on, and the back 42 is provided with a downwardly and rearwardly extending arm 43 adapted to engage a catch 44 formed on the combined catch and releasing lever 45 fulcrumed at 46 on the support 40. The combined catch and releasing lever 45 is provided with a handle 47 and a spring 48 connects the lower end of the said lever with the bracket 40. It will be noticed that when the back 42 is in upright position it is held against rearward and downward movement by the arm 43 engaging the catch 44, but when it is desired to swing the back 42 downwardly and rearwardly into an approximately horizontal position it is only necessary for the rider to take hold of the handle 47 and swing the same rearwardly to unlock the back 42 and to allow of imparting a downward swinging motion to the back 42.

In the modified form shown in Fig. 4, the support 60 is provided with a pivot 61 on which is mounted to swing the back 62 provided with a downwardly and rearwardly extending arm 63 engaging a catch 64 formed on a combined catch and releasing lever 65 fulcrumed at 66 on the support 60. The combined catch and releasing lever 65 is provided with an upwardly and slightly rearwardly curved handle 67 adapted to be taken hold of by the rider for unlocking the back and swinging the same from normal upright position rearwardly and downwardly into an approximately horizontal position and vice versa. A spring 68 connects the combined catch and releasing lever 65 with the bracket 60 to hold the catch 64 in engagement with the extension arm 63 of the back 62. The back 62 is provided with a stop 69 for limiting the rearward swinging movement of the handle 67.

From the foregoing it will be seen that the folding back is very simple and durable in construction and composed of comparatively few parts not liable to get out of order easily. It will also be seen that the construction disclosed is very simple owing to the use of the combined catch and releasing lever. In my previous patent the catch and releasing lever were separate parts and thus rendered the construction more complicated.

Having thus described my invention, I claim as new and desire to secure by Letters Patent:—

1. A folding back for the saddle of a motor cycle, bicycle and like machine, comprising a support held on the saddle, a back mounted to swing on the said support from upright to horizontal position and vice versa, the back having a notch, a combined catch and releasing lever fulcrumed on the said support and having a handle, and a pin on the said lever and adapted to engage the said notch to lock the back in upright position.

2. A folding back for the saddle of a motor cycle, bicycle and like machine, comprising a support held on the saddle, a back mounted to swing on the said support from upright to horizontal position and vice versa, the back having a notch, a combined catch and releasing lever fulcrumed on the said support and having a handle, a pin on the said lever and adapted to engage the said notch to lock the back in upright position, and a spring connecting the said back with the said lever.

3. A folding back for the saddle of a motor cycle, bicycle and like machine, comprising a support held on the saddle, a back mounted to swing in the said support from upright to horizontal position and vice versa, a combined catch and releasing lever fulcrumed on the said support and having a handle, coöperating means on the said lever and back to lock the back in upright position, and a spring for holding the coöperating means in engagement.

4. A folding back for the saddle of a motor cycle, bicycle and like machine, comprising a support held on the saddle, a back mounted to swing on the said support from upright to horizontal position and vice versa, a combined catch and releasing lever fulcrumed on the said support and having a handle, coöperating means on the said lever and back to lock the back in upright position, and a spring connecting the said back with the said lever.

HOWARD W. WEED.